United States Patent
Ishida et al.

(10) Patent No.: US 6,291,764 B1
(45) Date of Patent: Sep. 18, 2001

(54) PHOTOVOLTAIC POWER GENERATION DEVICE

(75) Inventors: Takeo Ishida; Ryuzo Hagihara; Hitoshi Kishi, all of Osaka (JP)

(73) Assignee: Sanyo Electronics Co., Ltd., Osaka (JP)

( * ) Notice: Subject to any disclaimer, the term of this patent is extended or adjusted under 35 U.S.C. 154(b) by 0 days.

(21) Appl. No.: 09/533,709

(22) Filed: Mar. 23, 2000

(30) Foreign Application Priority Data

Mar. 24, 1999 (JP) .................................................. 11-079931

(51) Int. Cl.⁷ ..................................................... H01L 31/04
(52) U.S. Cl. .......................... 136/293; 136/258; 136/291; 323/906; 363/15; 363/27
(58) Field of Search ..................... 136/258 AM, 258 PC, 136/293, 291; 323/906; 363/15, 27

(56) References Cited

U.S. PATENT DOCUMENTS

| | | | |
|---|---|---|---|
| 4,333,136 | * | 6/1982 | Baker ..................................... 136/293 |
| 4,375,662 | * | 3/1983 | Baker ..................................... 136/293 |
| 4,390,940 | * | 6/1983 | Corbefin et al. ...................... 136/293 |
| 5,886,890 | * | 3/1999 | Ishida et al. ............................. 363/65 |
| 6,175,512 | * | 1/2001 | Hagihara et al. ....................... 363/71 |

FOREIGN PATENT DOCUMENTS

| | | | |
|---|---|---|---|
| 1039621-A2 | * | 9/2000 | (EP) . |
| 61/55719-A | * | 3/1986 | (JP) . |
| 8/98549-A | * | 4/1996 | (JP) . |

\* cited by examiner

*Primary Examiner*—Alan Diamond
(74) *Attorney, Agent, or Firm*—Arent Fox Kintner Plotkin & Kahn, PLLC (57) ABSTRACT

The present invention prevents an increase in an overvoltage and increases an optimum operating voltage of a power inverter. A photovoltaic power generation device is provided with a solar cell device 1, a power inverter 2 for inverting output from the solar cell device 1 into AC power, a current path circuit 3 connected in parallel between the solar cell device 1 and the power inverter 2, and a current detection circuit 4 for detecting a current feeding back to the solar cell device 1. When a current detected by the current detection circuit 4 reaches beyond a predetermined current value, the current path circuit 3 is cut off.

10 Claims, 8 Drawing Sheets

PHOTOVOLTAIC POWER GENERATION DEVICE

BACKGROUND OF THE INVENTION

1. Field of the Invention

This invention relates to a photovoltaic power generation device, more particularly relates to a photovoltaic power generation device for protecting a power inverter from an overvoltage.

2. Description of Prior Art

A solar cell device for generating photovoltaic power, which is located outside, has been paid attention as a promising way for solving the global environmental problems. A photovoltaic power generation system, in which a solar cell device arranged on a roof or the like generates power and covers the power consumed during the daytime, has been developed.

In this system, power outputted from the solar cell device is a direct current. Therefore, the power is inverted from the direct current outputted from the solar cell device into an alternate current by a power inverter before use.

The above power inverter does not start immediately after obtaining power generated in the solar cell device, but starts after checking output from the solar cell device for a predetermined time. It is because that noise may be generated in the output power when the power inverter starts under an unstable condition of power generation by the solar cell device such as at dawn of day.

As described above, since a conventional power inverter does not start until the power generated in the solar cell device is stabilized for a predetermined time, an open voltage increases. Particularly, in an early morning of winter, an open voltage becomes large. As a result, a power inverter with a larger withstand voltage than an operating voltage is required, and it causes an increase in cost and a deterioration in operation efficiency at a normal operating voltage.

SUMMARY OF THE INVENTION

The present invention was made to solve the above described problems by presenting an increase in an open voltage and an overvoltage applied to a power inverter. In addition, the present invention was made to increase an optimum operating voltage of a power inverter and provide a photovoltaic power generation device capable of improving operation efficiency.

A photovoltaic power generation device according to this invention comprises a solar cell device, a power inverter for inverting output from the solar cell device into AC power, a current path circuit connected in parallel between the solar cell device and the power inverter, and a current detection circuit for detecting a current which feeds back to the solar cell device. The current path circuit is cut off when the current detected by the current detection circuit reaches beyond a predetermined current value.

The solar cell device in the photovoltaic power generation device comprises an amorphous silicon solar cell element.

In the above composition, when a current generated in the solar cell device does not reach a predetermined value, a little current flows through the current path circuit. Thus, the solar cell device does not have an open voltage even when the power inverter does not operate. An increase in a voltage is suppressed, and a withstand voltage can be ensured even when an optimum operating voltage is set high.

When an amorphous silicon solar cell element is used as a solar cell device, a fill factor (F.F.) is small. It sometimes causes a voltage beyond a maximum input voltage in an early morning of winter. In the present invention, an increase in voltage does not change much in comparison with a state when a power inverter is operating because a current flows through the current path circuit at the same time when power generation starts.

The current detection circuit in the photovoltaic power generation device detects a current on a basis of output from a blocking diode.

The circuit can be co-used since a current is detected by utilizing output of the blocking diode.

A photovoltaic power generation device according to this invention comprises a solar cell device, a power inverter for inverting output from the solar cell device into AC power, a current path circuit connected in parallel between the solar cell device and the power inverter, a power supply circuit provided between the current path circuit and the power inverter and controlled by output from the current path circuit, and a current detection circuit for detecting a current which feeds back to the solar cell device. The current path circuit is cut off when the current detected by the current detection circuit reaches beyond a predetermined current value.

The power inverter in the photovoltaic power generation device includes a main circuit and a control circuit, and driving power for the control circuit is applied from the solar cell device.

In the above composition, when a current generated in the solar cell device is less than a predetermined value, a little current flows through the current path circuit. Thus, the solar cell device does not have an open voltage even when the power inverter does not operate. An increase in a voltage is suppressed, and a withstand voltage can be ensured even when an optimum operating voltage is set high.

The current detection circuit in the photovoltaic power generation device detects a current on a basis of a blocking diode.

The power supply circuit in the photovoltaic power generation device switches a current dividing the current path circuit and a current from the solar cell device from one another and supplies either of them.

The power supply circuit in the photovoltaic power generation device is provided with means for turning on and off a current flowing between the solar cell device and the power inverter, and means for supplying a current supplied from the current path circuit to the power inverter.

The means for turning on and off a current in the photovoltaic power generation device is a thyristor or a self-hold type relay.

The foregoing and other objects, features, aspects and advantages of the present invention will become more apparent from the following detailed description of the present invention when collected conjunction with the accompanying drawings.

DESCRIPTION OF THE PREFERRED EMBODIMENT

Embodiments of the present invention are described by referring to the drawings.

Figure 1:
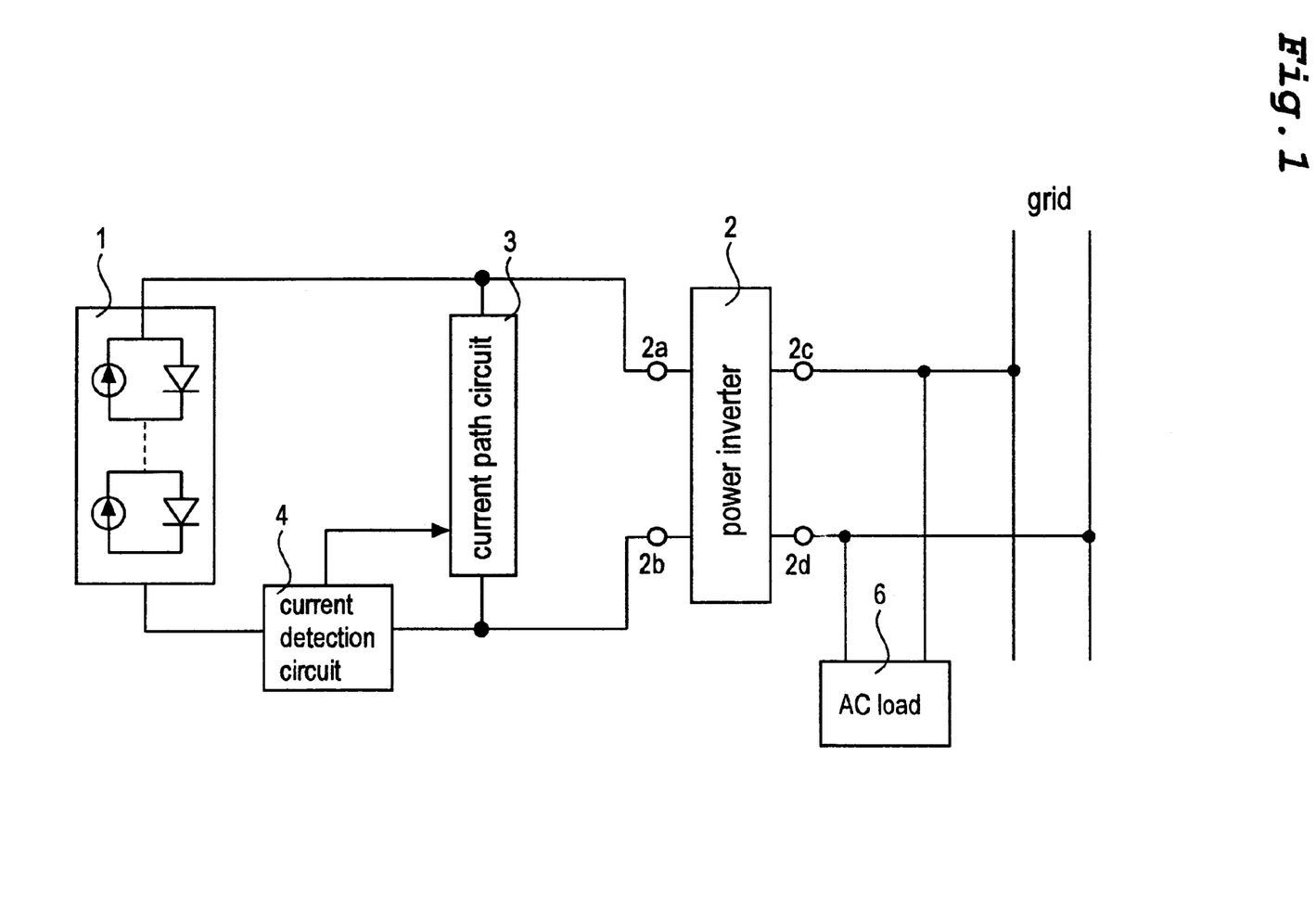
FIG. 1 is a block diagram illustrating a first embodiment of the present invention.

FIG. 1 is a block diagram illustrating a first embodiment of the present invention. A solar cell device 1 comprises a plurality of solar cell elements of such as amorphous silicon or crystalline silicon, connected in series or in parallel and arranged on a roof or the like, for outputting a predetermined power. DC power generated by the solar cell device 1 is applied to a power inverter 2 through input terminals 2a and 2b. A withstand voltage of the power inverter 2 of this embodiment is a little larger than an optimum operating voltage. DC power is inverted into AC power by the power inverter 2, and the AC power is applied to an electric system inside through output terminals 2c and 2d, and the power is supplied to an AC load 6 connected to the electric system.

The electric system is linked with a commercial power system, and power from the commercial power system can be available when power supplied from the solar cell device 1 runs short at night.

In this invention, a current path circuit 3 is arranged between the input terminals 2a and 2b of the power inverter 2 and the output terminals of the solar cell device 1. Operations of the current path circuit 3 is controlled on a basis of output from a current detection circuit 4 for measuring a feedback current which is arranged on a return side of the solar cell device 1.

In this embodiment, the input terminal 2a is a positive terminal, and the input terminal 2b is a negative terminal.

The current path circuit 3 includes a bias resistor and a switching element. The switching element turns on and off corresponding to output from the current detection circuit 4. A current flows through the current path circuit 3 until a feedback current reaches a predetermined current value, and the current is not applied to the power inverter 2 and gets back to the solar cell device 1.

As output from the solar cell device 1 increases, a current flowing through the electric path circuit 3 increases. When the current detection circuit 4 detects a predetermined current value, that is output from the solar cell device 1 reaches a voltage at which the power inverter 2 starts, the electric path circuit 3 is cut off, and all of power generated in the solar cell device 1 is supplied to the power inverter 2.

Although not shown in the figure, the power inverter 2 measures a current flowing through the current path circuit 3 and determines whether a voltage of the solar cell device 1 reaches a voltage for starting. The power inverter 2 starts after checking output from the solar cell device 1 for a predetermined time.

When the solar cell device 1 is open and generates a maximum voltage, a current of the solar cell (Ipv) is zero. In the present invention, when the power inverter 2 is at a stop or the voltage of the power inverter 2 does not reach a level for starting, a current flows from the current path circuit 3 for suppressing an increase in a voltage. A bias resistor of the current path circuit 3 having a strong resistance is used corresponding to the withstand voltage of the power inverter 2. When the current generated in the solar cell device 1 flows through the current path circuit 3, the voltage decreases and the voltage increase can be restrained. When the power inverter 2 is operating, the current of the solar cell flows through the power inverter 2. In this state, the solar cell current also flows through the current path circuit 3, thus the generated electric power is used but in vain. In the present invention, when the voltage of the solar cell device 1 reaches beyond a voltage for starting of the power inverter 2 and the power inverter 2 starts operations, the current path circuit 3 is cut off on a basis of output from the current detection circuit 4.

Since the bias resistor etc. is set in the current path circuit 3 so that a withstand voltage corresponds to the maximum voltage during operation, a large voltage is not likely to be inputted into the power inverter 2. Thus, an optimum operating voltage can be set high, and the efficiency of the system can improve.

Figure 2:
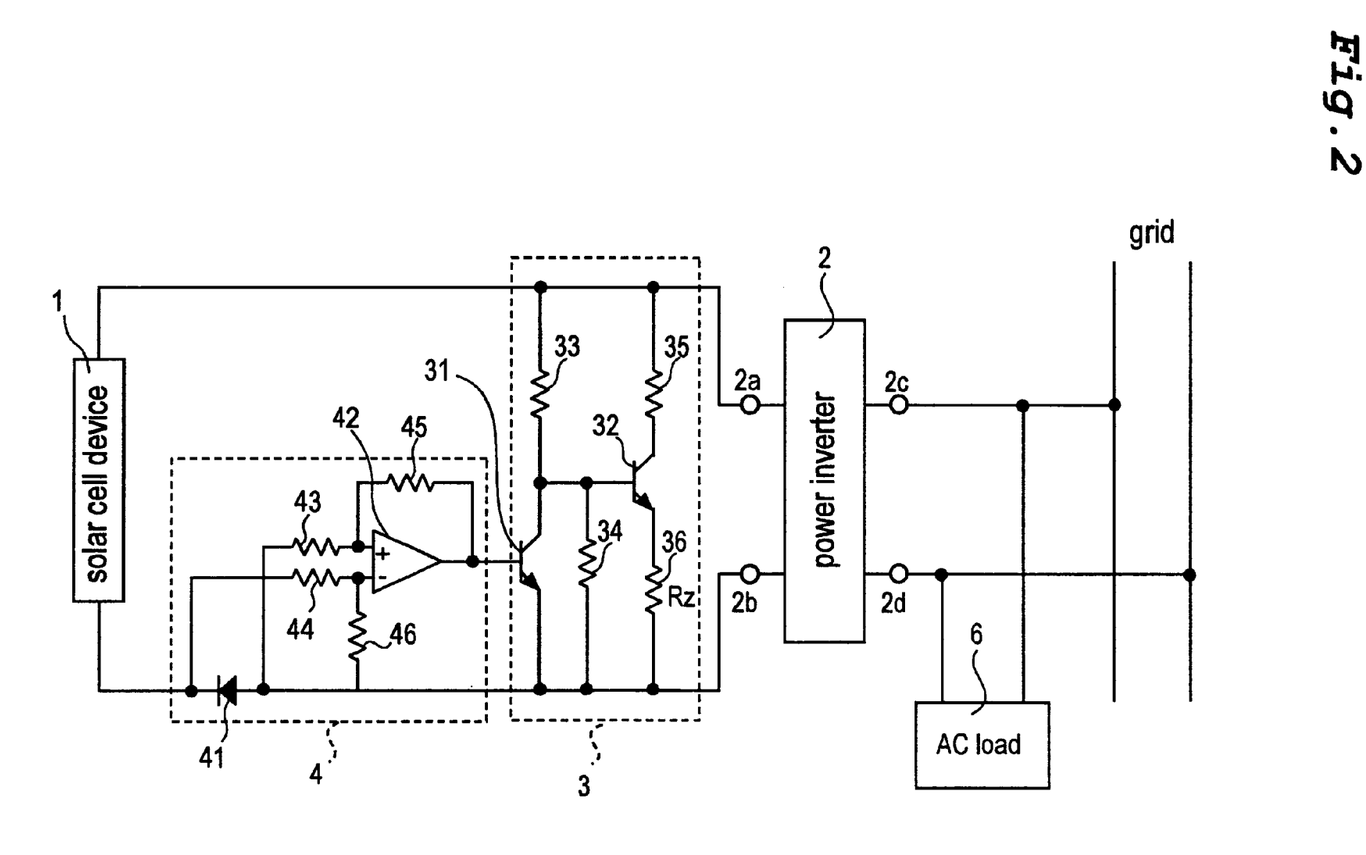
FIG. 2 is a circuit diagram for the first embodiment of the present invention.

FIG. 2 is a circuit diagram illustrating a first embodiment of the present invention. As shown in FIG. 2, the current path circuit 3 includes a first transistor 31 and a second transistor 32. Output from the current detection circuit 4 is applied to a base of the first transistor 31. A collector of the first transistor 31 is connected to a line on the output (positive) side of the solar cell device 1 through a resistor 33, and an emitter is connected to a line on the feedback (negative) side of the solar cell device 1. The collector of the first transistor 31 is connected to a base of the second transistor 32 and a collector of the second transistor 32 is connected to a line of the output side of the solar cell device 1 through a resistor 35, and an emitter of the second transistor 32 is connected to a line on a feedback side of the solar cell device 1 through a bias resistor 36. A base of the second transistor 32 is connected to a line on the feedback side through a resistor 34. Resistance values of the resistors 33, 34, and 35 are appropriately selected on the basis of the characteristics with the first transistor 31 and the second transistor 32, and the bias resistor (Rz) 36 is determined corresponding to a withstand voltage of the power inverter 2 to be used.

The current detection circuit 4 detects a current by the aid of output from a blocking diode 41. Output from the blocking diode 41 is inputted to one end of a differential amp 42 through a resistor 44, and the output from the differential amp 42 is supplied to an other end of the differential amp 42 through the feedback resistor 45. The other end input of the amp 42 is connected to the feedback line through a resistor 43. The one end input of the amp 42 is connected to the feedback line through the resistor 46. The resistors 43, 44, 45, and 46 adjust gain from the blocking diode 41, and are selected so as to obtain an output value for cutting off the current path circuit 3 when a current value suitable for starting of the power inverter 2 is obtained.

Figure 3:
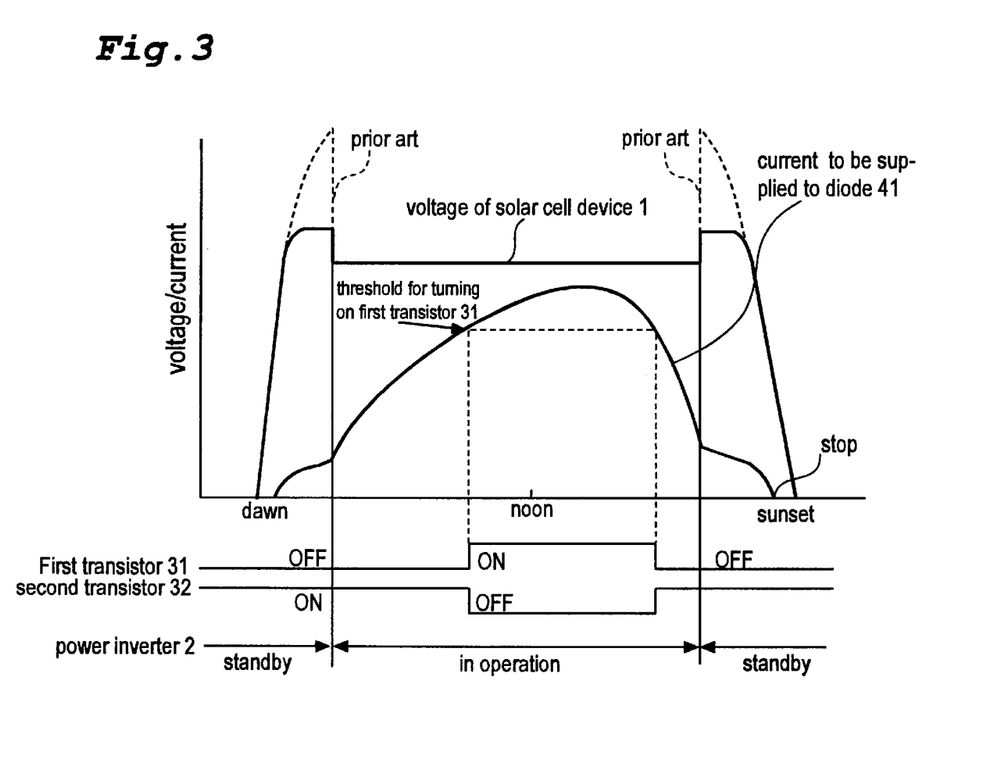
FIG. 3 is a characteristic chart illustrating an operation of a power inverter in response to a characteristic of a solar cell device.
Figure 4:
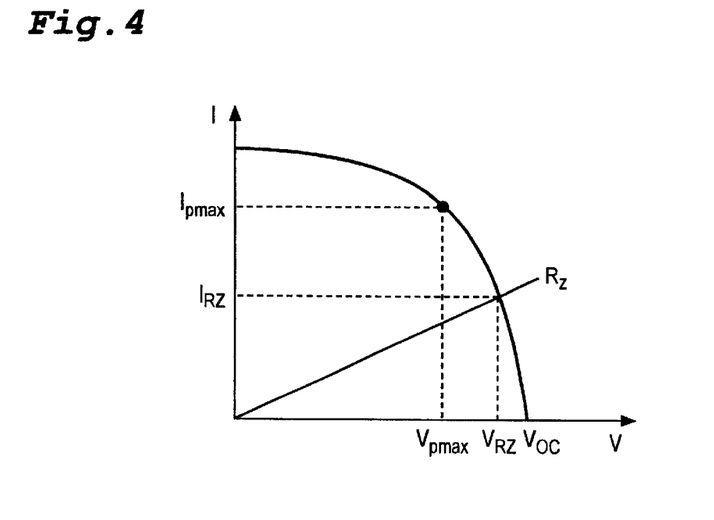
FIG. 4 is a voltage/current characteristic chart of the solar cell device of the present invention.

Operations according to the present invention are described by referring to FIGS. 3 and 4. FIG. 3 is a characteristic chart illustrating an operation state of the power inverter 2 corresponding to the characteristic of the solar cell device 1, and FIG. 4 is a voltage/current characteristics chart of the solar cell device 1.

The power inverter 2 is at a stop until the solar cell device 1 starts power generation. In this situation, a current does not flow from the blocking diode 41 and the first transistor 31 is off. When the first transistor 31 is off, the second transistor is on and the current path circuit 3 is being connected to the solar cell device 1.

In an early morning, when the sunlight is irradiated to the solar cell device, a current generated by the solar cell device 1 flows through a bias resistor 36 of the current path circuit 3, and returns to the solar cell device 1 through the blocking diode 41. As the sun rises, a DC voltage from the solar cell device 1 increases. Since the first transistor 31 is off and the second transistor is on, the solar cell is connected to the bias resistor 36 (Rz), as shown in FIG. 4, and the DC voltage does not increase beyond an operating voltage VRz which is determined by a cross point of the load line of Rz and the IV characteristic curve of the solar cell. VRz is set so as to sufficiently reach beyond a starting voltage of the power inverter 2.

When the power inverter 2 starts, a current of the solar cell gradually increases, and the solar cell operates at around the optimum operation point Pmax. At that time, the current flowing through the blocking diode 41 increases from Irz to Ipmax and the first transistor 31 is turned on by output from the current detection circuit 4. When the first transistor 31 is turned on, the second transistor 32 is turned off, and the current path circuit 3 is cut off. The direct current from the solar cell device 1 is applied only to the power inverter 2 and output from the solar cell device 1 can be used fully.

In the present invention, a little current flows through the current path circuit 3 even in a state where the solar cell device 1 just starts power generation. Thus, an overvoltage can be prevented. For example, when a current does not flow, an open voltage increases as shown in a dotted line of FIG. 3, and it becomes a maximum voltage when the power inverter 2 starts. On the other hand, in the present invention, a voltage can be prevented from reaching beyond an operating voltage since a current flows through the current path circuit 3 even when the voltage increases with the increasing DC output power of the solar cell device 1. Accordingly, a withstand voltage can be ensured even when an optimum operating voltage is set high.

In FIG. 3, the power inverter 2 controls itself by a maximum power point trucking operation when reaching beyond the predetermined DC power output.

When the output of power generated by the solar cell device decreases as the sun sets, the current output from the current detection circuit 4 decreases, and the first transistor 31 is turned off and the second transistor 32 is turned on, and the current path circuit 3 is connected. Then the power inverter 2 stops operation.

When amorphous silicon is particularly used as the solar cell device 1 of which a fill factor (F.F.) is small, a voltage is likely to rise beyond a maximum input voltage in an early morning of winter. By using this invention, a current starts flowing through the current path circuit 3 at the same time of a start of power generation, thus an increase in a voltage is almost the same as in a case that the power inverter 2 is under operation.

According to the present invention, an optimum operating voltage can be set high and the efficiency of the power inverter 2 can be improved.

For example, the open voltage becomes high conventionally, the power inverter 2 having a withstand voltage of 350V is used for an inverter of an operating voltage 180V with relation to an open voltage. Therefore, an operating current becomes approximately 16.6A. On the other hand, according to the present invention, when the device of a withstand voltage of 350V is used, the operating voltage can be 230V. Therefore, the operation current becomes 13.0A.

When considering improvement of a current $I^2R$ loss, $(13.0/16.6)^2=0.6$ is proven and 40% of improvement can be achieved.

For example, when the efficiency of the power inverter 2 is 92% and a loss is all $I^2R$, the loss is 4.8% and the efficiency can be improved to approximately 95%.

In the above embodiment, output from the blocking diode 41 is used as the current detection circuit 4. It is not limited to this, and a shunt resistor etc. can also be used.

Figure 5:
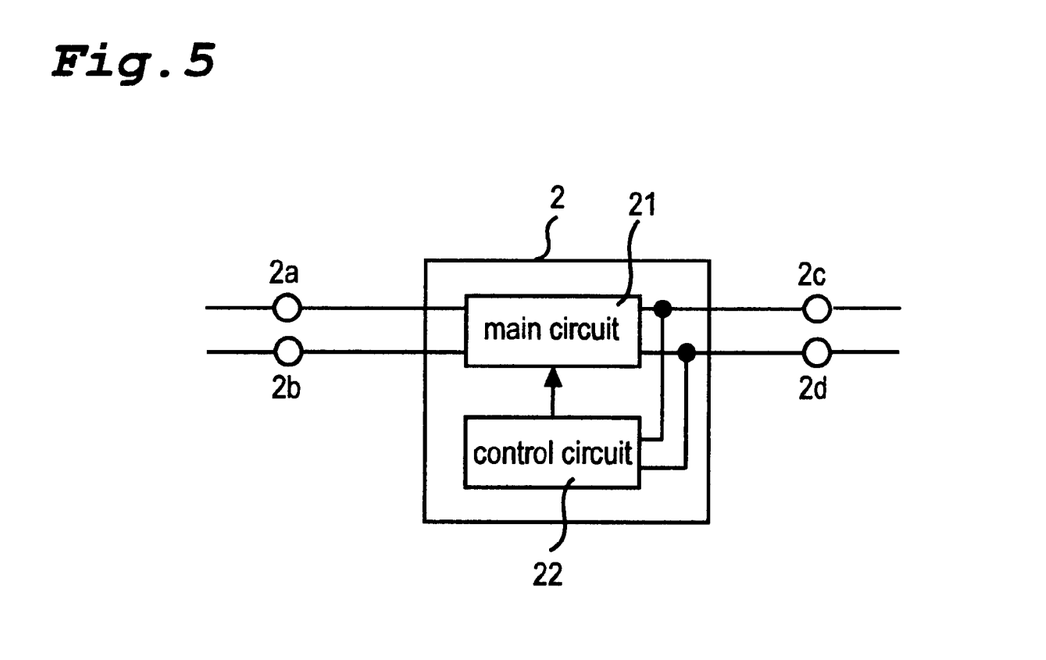
FIG. 5 is a block diagram illustrating a composition of the power inverter used in the present invention.

As shown in FIG. 5, the power inverter 2 includes a main circuit 21 for inverting DC power into AC power, and a control circuit 22 for controlling the main circuit 21. It is necessary to supply power to the control circuit 22 and operate the control circuit 22 in order to drive the power inverter 2. In the case of FIG. 4, the control circuit 22 is connected to a grid or the like and power is supplied from the grid.

A second embodiment of the present invention is composed so as to supply power to the control circuit 22 of the power inverter 2 from the solar cell device 1.

Figure 6:
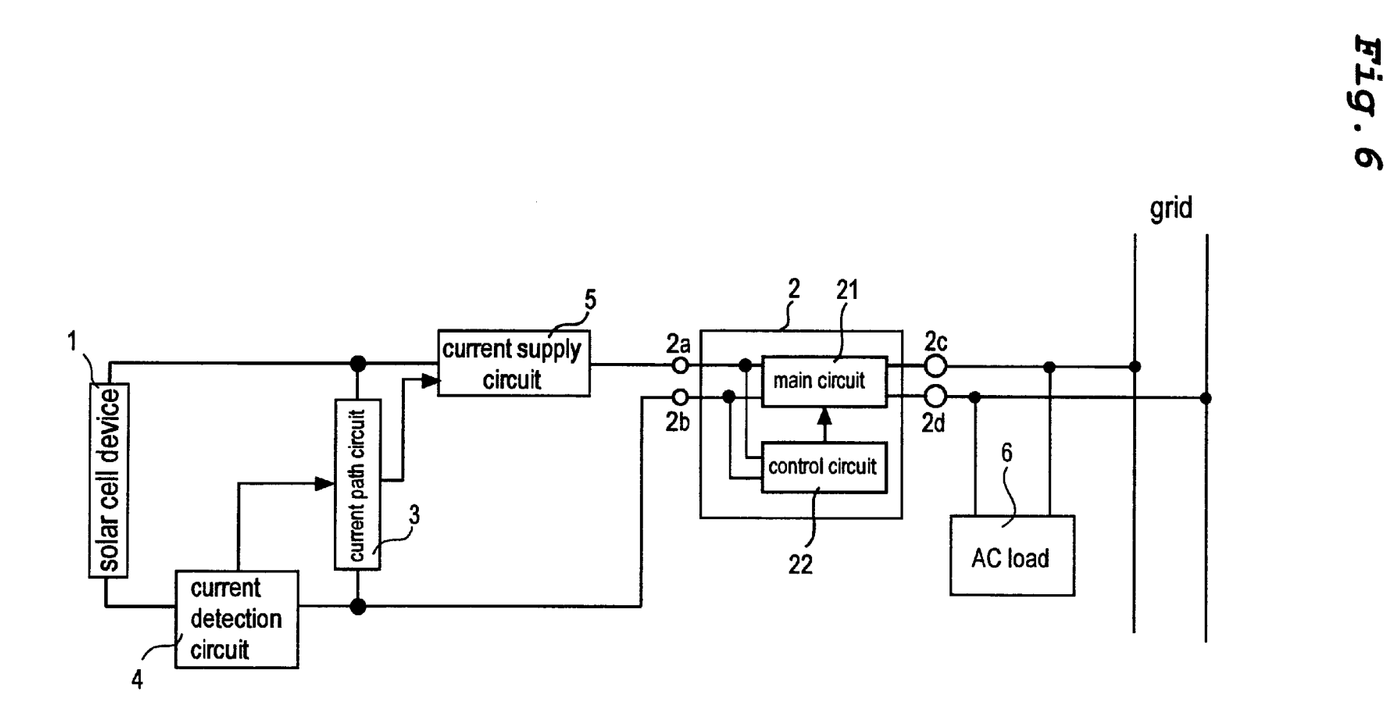
FIG. 6 is a block diagram illustrating a second embodiment of the present invention.

FIG. 6 is a block diagram illustrating the second embodiment of the present invention. Elements same as in the first embedment has the same reference numerals.

In the second embodiment, as shown in FIG. 6, an current supply circuit 5 which is controlled by output from the current path circuit 3 is provided between the power inverter 2 and the current path circuit 3. A control circuit 22 of the power inverter 2 is driven by power from the solar cell device 1.

In the first embodiment, a current flows through the current path circuit 3 until a feedback current detected by the current detection circuit 4 reaches a predetermined current value, and the current is not applied to the power inverter 2. In the second embedment, in principle, the current flows through the current path circuit 3 until a feedback current detected by the current detection circuit 4 reaches a predetermined current value, and a part of the current flowing through the current path circuit 3 is applied to the control circuit 22 of the power inverter 2 by the current supply circuit 5.

When the solar cell device 1 is generating power, the current from the power supply circuit 5 drives the control circuit 22 of the power inverter 2. The control circuit 22 uses a very little of power, and can operate even with a very little of power from the solar cell device 1 at a time of sunrise. Supply of power from the power supply circuit 5 to the control circuit 22 of the power inverter 2 implements driving and controlling of the power inverter 2 without using power from a grid or the like. Needless to say, to ensure operations of the control circuit 2, a battery for backup is prepared for responding a sudden break of power from the solar cell device 1 so that the control circuit 2 operates securely.

As increasing in output from the solar cell device 1, a current flowing through the current path circuit 3 increases. When the current detection circuit 4 detects a predetermined current value, that is output from the solar cell device 1 reaches a voltage at which the power inverter 2 starts, the electric path circuit 3 is cut off, and all of power generated in the solar cell device 1 is supplied to the power inverter 2.

In the second embedment, when the solar cell device 1 is open and generates a maximum voltage, a very little of solar cell current (Ipv) is applied from the electric supply circuit 5, for example as small as 0.1A.

In this invention, when the power inverter 2 is at a stop or a voltage for staring operation does not reach the predetermined value, a current flows through the current path circuit 3 in order to suppress an increase in a voltage. The current path circuit 3 determines a resistance by a voltage dividing resistor corresponding to a withstand voltage of the power inverter 2, while considering a current from the current supply circuit 5.

When a current generated in the solar cell device 1 flows through the current path circuit 3, a voltage drops and an increase in a voltage can be prevented. When the power inverter 2 is operating, a solar cell current flows through the power inverter 2 and the solar cell device is not open. In this case, when the solar cell current flows through the current path circuit 3, the generated current is used but in vain. Therefore, in this embodiment, when the solar cell device 1 reaches beyond a voltage for staring operation of the power inverter 2 and the power inverter 2 starts a normal operation, the current path circuit 3 is cut off by the output from the current detection circuit 4.

When a resistor etc. are set in the current path circuit 3 so that the power inverter can have a withstand voltage corresponding to a maximum voltage level during operations, a large voltage does not input to the power inverter 2. Therefore, an optimum operating voltage can be set high, and the system efficiency can be improved.

Figure 7:
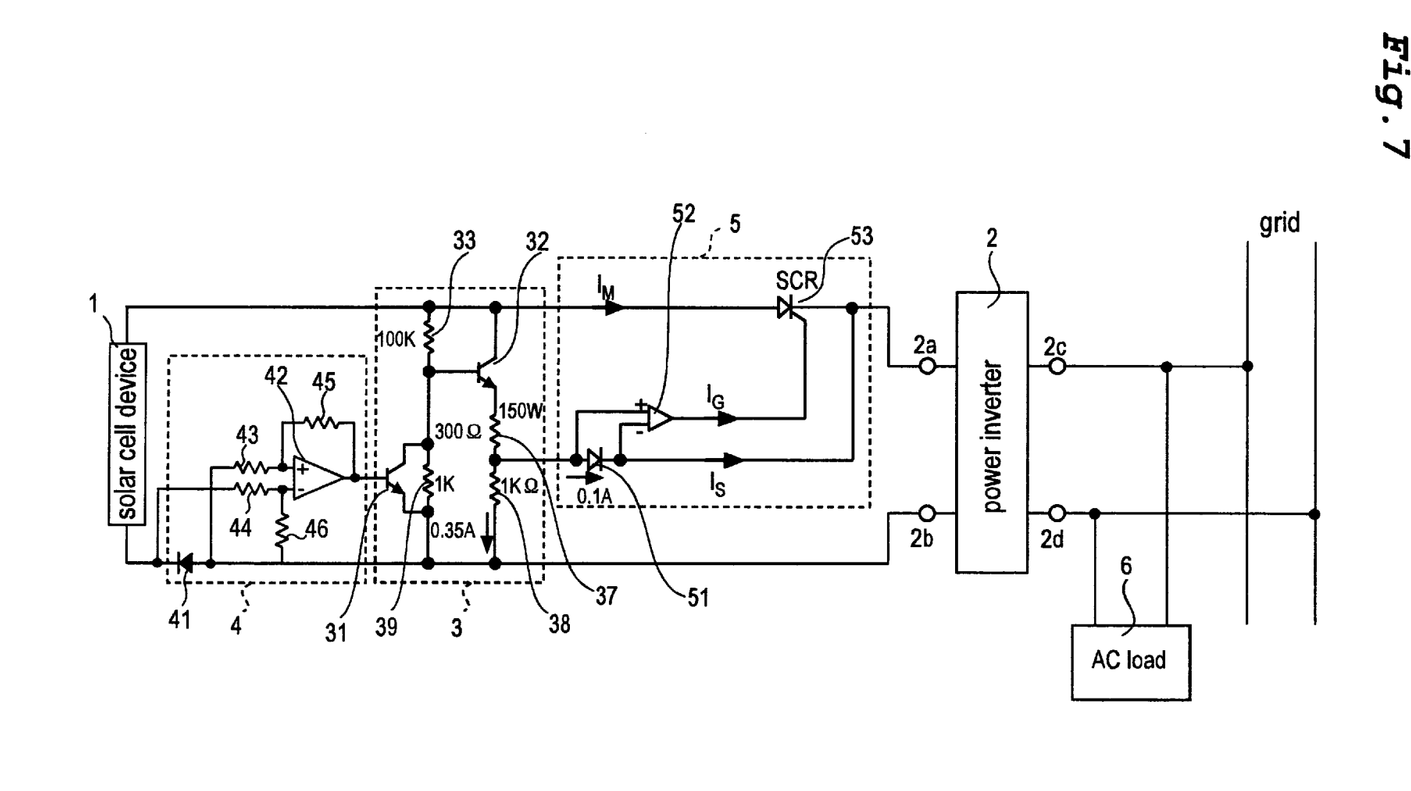
FIG. 7 is a circuit diagram illustrating one example of the second embodiment of the present invention.

FIG. 7 is a circuit diagram of a concrete example of the second embedment. The current path circuit 3 includes a first transistor 31 and a second transistor 32. Output from the current detection circuit 4 is applied to a base of the first transistor 31. A collector of the first transistor 31 is connected to a line of an output (+) side of the solar cell device 1 through a resistor 33. An emitter of the first transistor 31 is connected to a line of a feedback (−) side of the solar cell device 1. The collector and the emitter of the first transistor 31 are connected with each other through the resistor 39. The collector of the first transistor 31 and a base of the second transistor 32 are connected.

A collector of the second transistor 32 is connected to a line of the output side of the solar cell device 1. An emitter of the second transistor 32 is connected to a line of the feedback side of the solar cell device 1 through the resistors 37 and 38. Output divided at the resistors 37 and 38 is applied to a diode 51 of the current supply circuit 5.

The line of the output (+) side of the solar cell device 1 is connected to a thyristor (SCR) 53 of the current supply circuit 5 in order to supply power from the solar cell device 1 to the power inverter 2. Output of the thyristor 53 is connected to the power inverter 2. When the thyristor 53 is on, a current $I_M$ from the solar cell device 1 is supplied to the power inverter 2.

Output from the diode 51 is applied to a negative terminal of the differential amp 52 and the power inverter 2. Output divided at the resistors 37 and 38 is applied to a positive terminal of the differential amp 52. An output current $I_G$ from the differential amp 52 is applied as a gate current to the thyristor 53.

An amplification factor of the differential amp 52 is set so as not to reach to a gate trigger voltage with a potential difference between an anode and a cathode of the diode 51 when the power generated in the solar cell device 1 is enough to drive the control circuit 22 of the power inverter 2 but is not enough to drive the main circuit 21. Thus, the thyristor 53 is not turned on when the sunshine illuminance is low.

An output current $I_S$ from the diode 51 is applied to the power inverter 2. Even when the thyristor 53 is off, that is, the solar cell device 1 and the power inverter 2 are interrupted, the diode 51 supplies power to the control circuit 22 of the power inverter 2 while the solar cell device is generating power.

Resistance values of the resistors 33 and 39 are appropriately selected with relation to characteristics of the first transistor 31 and the second transistor 32, and voltage dividing resistors 37 and 38, and the current detecting circuit 4 are the same as in FIG. 2 and have the same reference numerals, thus explanation on them is omitted. A detecting means such as a current sensor using a hole element can be used instead of the blocking diode 41.

Operations of the circuit shown in FIG. 7 are described.

The power inverter 2 does not operate until the solar cell device 1 starts power generation. A current does not flow from the blocking diode 41. The first transistor 31 is off. When the first transistor 31 is off, the second transistor 32 is on and the current path circuit 3 stays connected to the solar cell device 1. The thyristor 53 stays off and the solar cell device 1 and the power inverter 2 are interrupted.

In an early morning, when the sunlight is irradiated to the solar cell device, a current generated in the solar cell device 1 is divided by the voltage dividing resistors 37 and 38 of the current path circuit 3 and returns to the solar cell device 1 through the blocking diode 41. The current detection circuit 4 detects a flowing current. A divided current is applied to the control circuit 22 of the power inverter 2 from the diode 51 as a current $I_S$. As described above, when the solar cell device 1 generates power enough for driving the control circuit 22 of the power inverter 2 but does not generate power enough for driving the main circuit 21, the thyristor 53 is not on. An amplification factor of the differential amp 52 is set so as not to reach to a gate trigger voltage of the thyristor 53 with a potential difference between an anode and a cathode of the diode 51 when the sunshine illuminance is low. A current generated in the solar cell device 1 flows through the current path circuit 3, and a voltage drops and an increase in a voltage can be suppressed.

As the sunshine iluminance increases and the control circuit 22 of the power inverter 2 starts the main circuit 21, a current Is from the diode 51 greatly increases. Then, an output voltage of the differential amp 52 reaches beyond a gate trigger voltage of the thyristor 53 with a potential difference of the diode 51, and the thyristor is turned on, and a current IM is supplied to the power inverter 2.

After the power inverter 2 starts, current of the solar cell device 1 gradually increases, and the solar cell device 1 can be operated at around an optimum operation point Pmax. At this point, a current flowing to the blocking diode 41 increases to the point of Ipmax, and the first transistor 31 is turned on by output supplied from the electric detection circuit 4. When the first transistor 31 is turned on, the second transistor 32 is turned off, and the current path circuit 3 is cut off. When the current path circuit 3 is cut off, an output current Is from the diode 52 becomes zero. Also, a gate current $I_G$ to the thyristor 53 is turned off, but the thyristor 53 stays on. A DC current $I_M$ from the solar cell device 1 is applied to the power inverter 2 and the output from the solar cell device 1 can be fully used.

In the second embodiment, a current flows through the current path circuit 3 and the current supply circuit 5 from at a time when the solar cell device 1 starts power generation, and it prevents an overvoltage. When a current does not flow, as indicated by a broken line shown in FIG. 3, an open voltage increases and the voltage reaches to a maximum at a starting of the power inverter 2. On the other hand, in this invention, a voltage rises as the DC output power of the solar cell device 1 increases. The current flows through the current path circuit 3 and the current supply circuit 5, and the voltage is suppressed from reaching beyond an operating voltage even when a voltage rises as the DC output power of the solar cell device 1 increases. As a result, a withstand voltage can be ensured even when an optimum operating voltage is set high. When the solar cell device 1 suddenly stops power generation, the first transistor 31 is turned off and the second transistor 32 is turned on, and the current path circuit 3 is connected. In addition, the gate current IG is off at that time, but an output current Is of the diode 51 let the thyristor 53 be short-circuited for turning the thyristor 53 off. Then, the solar cell device 1 and the power inverter 2 are interrupted.

When the solar cell device 1 starts power generation again, the thyristor 53 is turned on and the current path circuit 3 is cut off, then power is supplied from the solar cell device 1 to the power inverter 2.

As power output from the solar cell device 1 decreases in the evening, current output from the current detection circuit 4 decreases. The first transistor 31 is turned off and the second transistor 32 is turned on, and the current path circuit 3 is connected. The solar cell device 1 sometimes supplies a current so that the main circuit 21 of the power inverter 2 can continue operation while reducing output to as small as a level which stops operation. In this condition, output voltage of the differential amp 52 reaches beyond a gate trigger voltage and the thyristor 53 is turned on. Then, power from the solar cell device 1 is supplied to the power inverter 2 through the thyristor 53. At that time, an operating voltage of the solar cell device 1 of Vpmax is substantially lower than an open voltage, and a high voltage is not likely to be supplied to the power inverter 2.

When the sunshine illuminance further lowers and the main circuit 21 of the power inverter 2 stops, a current Is flows as little as to drive the control circuit 22, and an output of the differential amp 52 is lower than a gate trigger voltage and a gate-off state is brought about. When a current Is flows, the thyristor 53 is short-circuited and turned off. Only a divided voltage through voltage dividing resistors 37 and 38 is supplied to the power inverter 2, and it prevents an open voltage from applying to the power inverter 2.

When the sunshine illuminance lowers further, the control circuit 22 stops and all of the element returns to a state before the solar cell device 1 generates power.

In the above embodiment, when the power inverter 2 is at a stop or just starts, a current $I_S$ from the diode 51 of the power supply circuit 5 is supplied to the control circuit 22 of the power inverter 2. While the power inverter 2 is operating, a current $I_M$ applied to the thyristor 53 is supplied to the control circuit 22 of the power inverter 2. The control circuit 22 of the power inverter 2 is driven by the supplied power.

In the circuit diagram of FIG. 7, an open voltage of the solar power device is 350V, the voltage of the solar cell device 1 during an operation is 200V, a resistance of the resistor 33 is 100 k Ω, a resistance of the resistor 37 is 1 k Ω, the resistor 36 is 150W and 300 Ω, and the resistor 37 is 1 k Ω. When the power inverter 2 is at a stop, a current 0.1A flows to the diode 51 and a current 0.35A flows to the resistor 38. The voltage on the power inverter side is 270V. The voltage of the solar cell device 1 become 260V at starting and a current $I_S$ becomes 0.1A. Voltages of the solar cell device 1 and the power inverter 2 during operations is 200V. At that time, the current $I_M$ is 15A.

Figure 8:
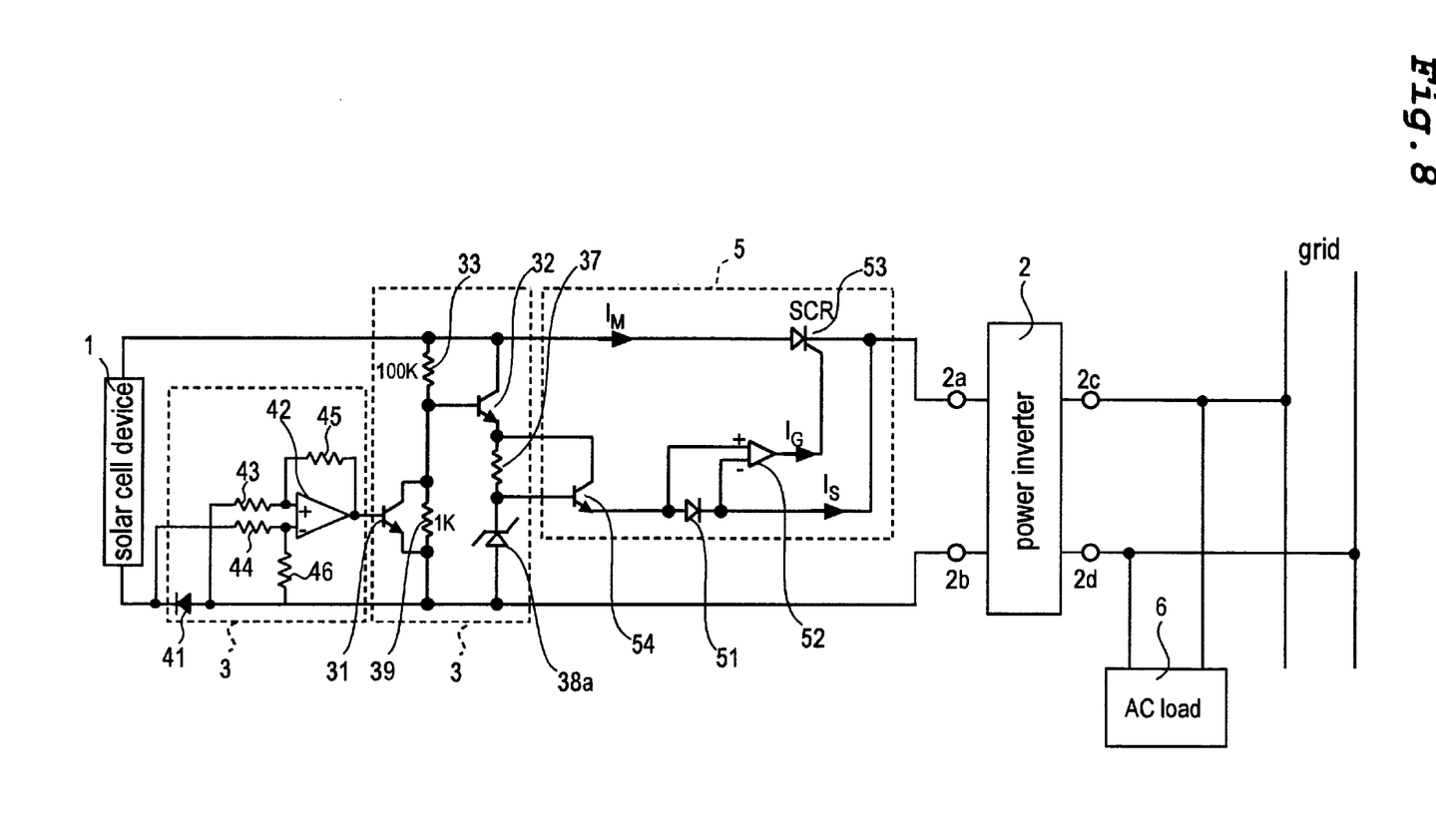
FIG. 8 is a circuit diagram illustrating another example of the second embodiment of the present invention.

FIG. 8 is another circuit diagram illustrating the second embodiment in concrete. Elements described in FIG. 7 has the same reference numerals as in FIG. 7 and explanation on them are omitted. In FIG. 8, a part of the power supply circuit 5 for giving a current when the power inverter 2 is at a stop and just starts is changed. In FIG. 7, a current Is is applied by dividing at the resistors 37 and 38. On the other hand, as shown in FIG. 8, they are replaced with a zener diode 38a and a transistor 54. A zener diode 38a replaces the resistor 38, and the emitter of the second transistor 32 and the collector of the transistor 54 are connected with each other and the emitter of the transistor 54 is connected to the diode 51.

By using this composition, a very little current $I_S$ can be supplied and $I^2R$ loss at a resistor can be less in comparison with a resistance voltage divider. A resistor of small wattage can be used as a resistor 36.

Figure 9:
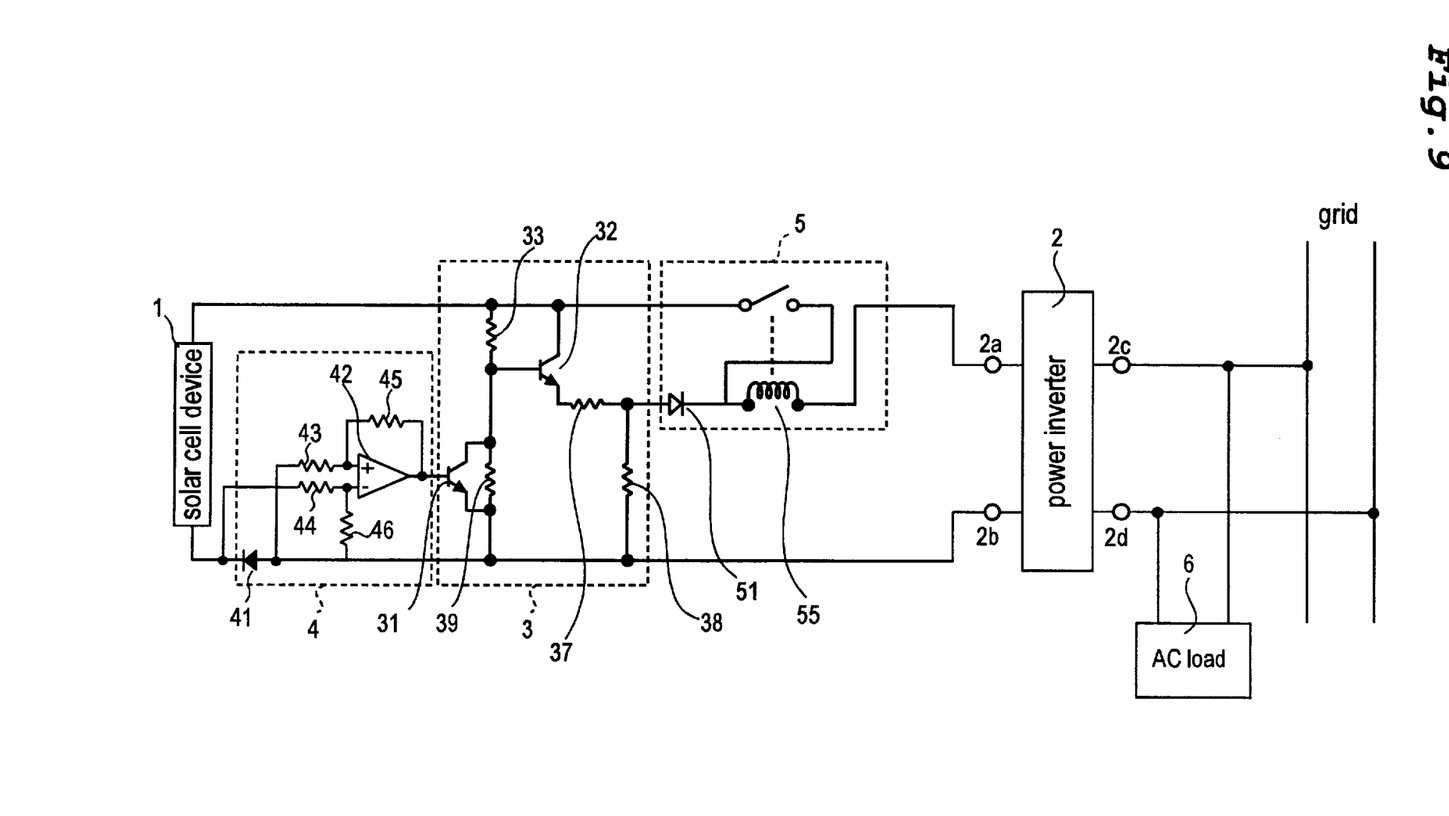
FIG. 9 is a circuit diagram illustrating another example of the second embodiment of the present invention.

FIG. 9 is another circuit diagram of the second embedment. Elements same as in FIG. 7 have the same reference numerals indicated in FIG. 7 and explanations on them are omitted. In FIG. 9, a self-hold relay 55 replaces the thyristor 53. The composition in FIG. 9 can also operate as described above.

As described above, in the present invention, when the current generated by the solar cell device is less than a predetermined value, a little current flows through the current path circuit. Therefore, the solar cell device does not produce an open voltage when the power inverter stops operation, and the increase in a voltage can be prevented and a withstand voltage can be ensured even when the optimum operating voltage is set high.

Although the present invention has been described and illustrated in detail, it is clearly understood that the same is and example only and is not to be taken by way of limitation by way of illustration, the spirit and scope of the present invention being limited only by the terms of the appended claims.

What is claimed is:

1. A photovoltaic power generation device comprising;

a solar cell device, a power inverter for inverting output from said solar cell device into AC power, a current path circuit connected in parallel between said solar cell device and said power inverter, and a current detection circuit for detecting a current which feeds back to said solar cell device, wherein said current path circuit is cut off when the current detected by said current detection circuit reaches beyond a current value.

2. The photovoltaic power generation device according to claim 1, wherein said current detection circuit detects a current on a basis of output from a blocking diode.

3. The photovoltaic power generation device according to claim 1, wherein said solar cell device comprises an amorphous silicon solar cell element.

4. A photovoltaic power generation device comprising;

a solar cell device, a power inverter for inverting output from said solar cell device into AC power, a current path circuit connected in parallel between said solar cell device and said power inverter, a power supply circuit provided between said current path circuit and said power inverter and controlled by output from said current path circuit, and a current detection circuit for detecting a current which feeds back to said solar cell device, wherein said current path circuit is cut off when the current detected by said current detection circuit reaches beyond a current value.

5. The photovoltaic power generation device according to claim 4, wherein said power inverter includes a main circuit and a control circuit, and driving power for the control circuit is applied from the solar cell device.

6. The photovoltaic power generation device according to claim 4, wherein said current detection circuit detects a current on a basis of output from a blocking diode.

7. The photovoltaic power generation device according to claim 4, wherein said power supply circuit switches a current which divides the current path circuit and a current from the solar cell device from one another, and supplies either of them.

8. The photovoltaic power generation device according to claim 4, wherein said power supply circuit is provided with means for turning on and off a current flowing between the solar cell device and the power inverter, and means for applying a current supplied from the current path circuit to the power inverter.

9. The photovoltaic power generation device according to claim 8, wherein said means for turning on and off a current is a thyristor.

10. The photovoltaic power generation device according to claim 8, wherein said means for turning on and off a current is a self-hold relay.

* * * * *